United States Patent [19]
Donatelli et al.

[11] Patent Number: 5,563,210
[45] Date of Patent: Oct. 8, 1996

[54] THIXOTROPIC ORGANOSILOXANE COMPOSITIONS

[75] Inventors: Joan M. Donatelli; Daniel F. McMahon, both of Midland, Mich.; David R. Salverson, Fremont, Calif.

[73] Assignee: Dow Corning Corporation, Midland, Mich.

[21] Appl. No.: 529,848

[22] Filed: Sep. 18, 1995

Related U.S. Application Data

[63] Continuation of Ser. No. 401,104, Mar. 8, 1995, abandoned.

[51] Int. Cl.$^6$ .................................................... C08K 5/24
[52] U.S. Cl. .............................. 524/731; 528/16; 528/17; 528/18
[58] Field of Search .................................. 528/16, 17, 18; 524/731

[56] References Cited

U.S. PATENT DOCUMENTS

| | | | |
|---|---|---|---|
| 5,036,131 | 7/1991 | Himstedt | 524/786 |
| 5,196,240 | 3/1993 | Stockwell | 427/389.9 |
| 5,326,521 | 7/1994 | East | 264/225 |

OTHER PUBLICATIONS

Abstract: Russian patent 1,502,586, dated Aug. 1989.
Abstract: East German patent 297,178 dated Jan. 1992.

*Primary Examiner*—Melvyn I. Marquis
*Attorney, Agent, or Firm*—Robert L. McKellar

[57] ABSTRACT

Organosiloxane oligomers wherein at least a portion of the siloxane units contain a silicon-bonded phenyl or phenylalkyl radical are suitable diluents for organosiloxane/oxyalkylene copolymers when these copolymers are used as thixotropic agents in the crosslinking agent portion of multipart moisture curable organosiloxane compositions.

6 Claims, No Drawings

THIXOTROPIC ORGANOSILOXANE COMPOSITIONS

This application is a continuation of application Ser. No. 08/401,104, filed on Mar. 8, 1995 and now abandoned.

BACKGROUND OF THE INVENTION

1. Field of the Invention

This invention relates to thixotropic organosiloxane compositions. More particularly, this invention relates to multi-part moisture curable organosiloxane compositions containing specified classes of thixotropic agents and fillers. The thixotropic agent, crosslinking agent, crosslinking catalyst and a specified class of solvents for the thixotropic agent are packaged separately from the crosslinkable polyorganosiloxane and a hydroxyl-containing filler.

2. Background Information

Various materials have been used to impart thixotropy to curable organosiloxane compositions.

U.S. Pat. No. 5,036,131, which issued to A. Himstedt on Jul. 30, 1991 describes silicone dispersions containing 100 parts by weight of a liquid silanol-terminated polydimethylsiloxane, a moisture activated curing agent, and finely ground alumina trihydrate. The thixotropic agent is the combination of an untreated fume silica and a liquid silanol-terminated polydiorganosiloxane containing phenylmethylsiloxane or 3,3,3-trifluoropropylsiloxane units that is incompatible with the polydimethylsiloxane. The polydiorganosiloxane reacts with the silica to form a surface that is incompatible with the polydimethylsiloxane.

From 0.25 to 2.5 part by weight of the incompatible polydiorganosiloxane is used per part of untreated silica.

Russian patent 1,502,586 issued to A. Chuiko et al. describes protective coatings containing a polymethylphenylsiloxane, toluene and a pyrogenic form of silica that has been surface-modified with methyl groups.

A disadvantage of using the incompatible filler described in the patents to Himstedt and Chuiko et al. in the base portion of a two part moisture curable organosiloxane composition comprising a silane containing alkoxy or other hydrolyzable groups as the curing agent and an organotin compound as the curing catalyst is the difficulty of processing the resultant highly thixotropic material.

East German patent No. 297,178, which issued to E. Alekseewa et al. on Jan. 2, 1992 describes compositions comprising a polyorganosiloxane containing methyl, phenyl and vinyl radicals, an organohydrogensiloxane containing methyl and phenyl radicals, and a platinum catalyst. The compositions also contain as a thixotropic agent a resinous copolymer with a) an organosiloxane copolymer containing units of the formulae $SiO_{4/2}$, (b) $RSiO_{1.5}$, (c) $R_2SiO$ and (d) $R_3SiO_{0.5}$ units, wherein from 5 to 30 mole percent of the R groups are phenyl, 1 to 5 mole percent are vinyl, the remainder are methyl and the molar ratio (c+d):(a+b) is from 0.7 to 1.4.

Other thixotropic agents that have been used in curable organosiloxane compositions include silica treated with various organosilicon compounds, chalk, dolomite, and organosiloxane/oxyalkylene copolymers in combination with a filler containing hydroxyl groups.

To achieve adequate storage stability some moisture curable organosiloxane compositions, particularly those containing tin compounds as the catalysts for the crosslinking reaction, are packaged with the tin compound and crosslinkable polyorganosiloxane in separate containers. The crosslinking agent is typically packaged together with the catalyst.

Because only a small volume of crosslinking agent relative to the volume of crosslinkable polyorganosiloxane is required to achieve the desired degree of crosslinking, the part of the composition containing the crosslinking agent typically contains a quantity of diluent that will allow this part to be blended with the part containing the crosslinkable polyorganosiloxane in a volume ratio of 1 part of curing agent portion to at least 10 parts of the portion containing the crosslinkable polyorganosiloxane. The diluent is a solvent for the crosslinking agent and the catalyst.

For some end use applications of two-part moisture curable organosiloxanes thixotropy would be undesirable. If the thixotropic agent were in the portion of the composition containing the crosslinkable polyorganosiloxane, typically referred to as the "base" portion, a user who wished to alternate between thixotropic and non-thixotropic compositions using the same mixing equipment for both types of compositions would have to change the container of base. If the thixotropic agent was in the crosslinking agent portion, using the conventional volume ratio of base to crosslinking agent portion of 10:1, the volume of material to be transferred during the change from a thixotropic to a non-thixotropic composition would be 1/10 of the volume to be transferred if the thixotropic agent was in the base portion.

The present inventors discovered that many of the diluents used in the crosslinking agent portion of conventional two-part moisture curable organosiloxane compositions will not dissolve the organosiloxane/oxyalkylene copolymers used as thixotropic agents in these compositions. The resultant two-phase composition results in non-uniform curing of the composition.

One objective of this invention is to provide multi-part moisture curable organosiloxane composition wherein the portion containing the crosslinking agent also contains a solubilized siloxane/oxyalkylene copolymer as the thixotropic agent. The resultant mixture is compatible with the crosslinkable polyorganosiloxane contained in the base portion of the composition, and forms a homogeneous composition when all the ingredients of the curable composition are combined.

SUMMARY OF THE INVENTION

This invention is based on the discovery that certain organosiloxane oligomers containing phenylalkylsiloxane units as at least a portion of the repeating units are suitable diluents for the organosiloxane/oxyalkylene copolymers used as thixotropic agents for moisture curable organosiloxane compositions.

DETAILED DESCRIPTION OF THE INVENTION

This invention provides moisture curable organosiloxane compositions comprising

I. A base portion comprising
   A. a curable liquid polydiorganosiloxane containing at least two silanol or hydrolyzable groups per molecule;
   B. a particulate filler containing hydroxyl groups on the surface of the particles;
II. a curing agent portion comprising C. an amount of a crosslinking agent sufficient to crosslink said composition in the presence of moisture of an organosilicon compound containing at least three silicon-bonded hydrolyzable groups per molecule;

D. an amount of a catalyst sufficient to promote crosslinking of said composition;

E. an amount sufficient to impart thixotropy to said composition of a liquid organosiloxane copolymer of a general formula selected from the group consisting of

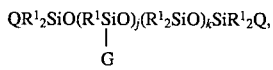

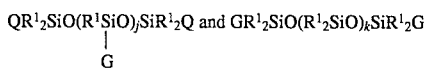

wherein each $R^1$ is individually selected from the group consisting of unsubstituted and substituted monovalent hydrocarbon radicals; G is a polyoxyalkylene group having an average structure selected from the group consisting of

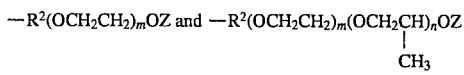

wherein $R^2$ represents a divalent hydrocarbon radical containing from 2 to 20 carbon atoms; Q is $R^1$ or G; Z is selected from the group consisting of hydrogen, alkyl radicals containing from 1 to 4 carbon atoms and acyl groups containing from 2 to 6 carbon atoms; j, k, m, and n are individually selected from positive integers; and F. a liquid organosiloxane oligomer containing an average of at least one phenylalkylsiloxane or (phenylalkyl)alkylsiloxane unit per molecule, wherein the alkyl radical and the alkyl portion of the phenylalkyl radical contain from 1 to 4 carbon atoms, and wherein the molecular weight and the concentration of phenyl-containing radicals in said organosiloxane oligomer are selected to achieve solubility of said crosslinking agent, catalyst and organosiloxane copolymer in said oligomer.

The solubility of the organosiloxane copolymer, crosslinking agent, and crosslinking catalyst in the liquid organosiloxane oligomer is typically determined at the use temperature of the curable composition, which can be 25° C. or lower.

The Moisture Curable Polyorganosiloxane (Ingredient A)

Organosiloxane compositions suitable for use with the present combinations of thixotropic agents and diluents cure in the presence of atmospheric moisture by the reaction of a liquid polyorganosiloxane containing at least two silanol or other hydrolyzable groups per molecule with an organosilicon compound containing at least three silicon-bonded alkoxy or other hydrolyzable groups per molecule.

The curable polyorganosiloxanes referred to in this specification as ingredient A preferably contain two silanol groups per molecule and can exhibit a linear or branched structure. The polyorganosiloxanes are liquids at 25° C.

The repeating units of ingredient A can be represented by the general formula $R^4{}_bSiO_{(4-b)/2}$, where $R^4$ represents an unsubstituted or substituted monovalent hydrocarbon radical and is 1 or 2. When b is 2 the hydrocarbon radicals represented by $R^4$ can be identical or different. This ingredient can contain one, two or more different types of repeating units.

Monovalent hydrocarbon radicals that can be represented by $R^4$ include alkyl radicals containing from 1 to 12 or more carbon atoms, substituted alkyl such as chloromethyl and 3,3,3-trifluoropropyl, aryl radicals such as phenyl and naphthyl, alkaryl radicals such as tolyl and xylyl and aralkyl radicals such as benzyl. Preferred radicals are alkyl such as methyl and ethyl, phenyl, and 3,3,3-trifluoropropyl. Most preferably b in the foregoing general formula is 2 and at least one of the $R^4$ groups on each silicon atom is a methyl radical.

To achieve a useful level of tensile strength and other physical properties in the cured material the number average molecular weight of ingredient A should be at least 20,000, preferably from 25,000 to 75,000. The viscosity of polyorganosiloxanes with number average molecular weights above about 100,000 are typically too viscous for convenient processing, particularly blending with the other ingredients of the present compositions using conventional mixing equipment.

The Hydroxyl-Containing Filler (Ingredient B)

The thixotropic character of curable compositions obtained by blending the present base and curing agent portions is believed to result from an interaction between the organosiloxane copolymer (ingredient E) and at least one hydroxyl-containing filler present in the base portion of the composition. Any of the known conventional hydroxyl-containing reinforcing and non-reinforcing type fillers used in curable organosiloxane compositions are suitable for this purpose.

Examples of suitable fillers include but are not limited to reinforcing fillers such as finely divided silica of the fumed or precipitated type, and non-reinforcing fillers such as alumina, titanium dioxide, silicates such as zirconium silicate, and calcium carbonate.

The filler or combination of fillers typically constitutes from 5 to 40 percent, preferably from 10 to about 30 percent of the weight of the base portion of the present compositions.

For some fillers, particularly, reinforcing fillers such as silica, treatment of the filler to react a portion of the hydroxyl groups present on the surface of the filler particles may be desirable to prevent a phenomenon referred to in the art as "creeping" or "crepe hardening". Useful filler treating agents include but are not limited to silanol-terminated low molecular weight polydiorganosiloxanes and hexaalkyl disilazanes.

The filler can be treated prior to being blended with the other ingredients of the present compositions or the treating agent can be combined with these ingredients to treat the filler in situ. The concentration of hydroxyl groups remaining following treatment should be sufficient to interact with the filler and provide the desired level of thixotropy.

The Crosslinking Agent (Ingredient C)

Crosslinking agents for the polyorganosiloxanes referred to as ingredient A of the present moisture curable compositions are typically organosilicon compounds containing an average of at least three silicon-bonded hydrolyzable groups per molecule. Preferred hydrolyzable groups are alkoxy containing from 1 to about 4 carbon atoms, carboxy containing from 2 to 4 carbon atoms and ketoximo such as methylethylketoximo.

The crosslinking agent, referred to hereinafter as ingredient C, can be a silane, disiloxane or a polyorganosiloxane. Silanes are generally preferred, based on their cost and availability. Preferred silanes include but are not limited to methyltrimethoxysilane, phenyl trimethoxysilane, vinyl trimethoxysilane, methyltriethoxysilane, methyltriacetoxysilane, methyltri(methylethylketoximo) silane, alkyl orthosilicates such as tetraethyl orthosilicate and condensation products of these orthosilicates, which are typically referred to as alkyl polysilicates.

The concentration of crosslinking agent should be sufficient to convert the composition to an elastomeric or resinous material exhibiting the desired physical properties in the presence of moisture. Typical moisture curable compositions contain from 0.5 to 6 weight percent of alkoxy or other hydrolyzable group based on the total weight of the curable composition.

The Curing Catalyst (Ingredient D)

In addition to the curable polyorganosiloxane and crosslinking agent, the curable composition includes a catalyst for the crosslinking reaction. Examples of suitable catalysts include but are not limited to compounds of titanium, aluminum, zirconium and tin. These catalysts promote hydrolysis of the hydrolyzable groups present on the crosslinking agent in the presence of moisture. Preferred catalysts for use with the present compositions when used for mold-making include divalent tin salts of carboxylic acids such as stannous acetate and stannous octoate and organotin compounds such as dimethyltin dineodecanoate, dibutyltin diacetate, dibutyltin dilaurate and dioctyltin diacetate. The carboxylic acid portion of these tin compounds contain from 1 to 20 carbon atoms.

The concentration of catalyst appears critical to achieving a useful cure rate following the inhibition period resulting from the presence of the working time extender. In preferred curable compositions of the present invention the concentration of catalyst is from 0.5 to about 5 weight percent, based on the weight of the crosslinkable polyorganosiloxane (ingredient A).

The Thixotropic Agent (Ingredient E)

The ingredient responsible for the thixotropic character exhibited by the present compositions is a liquid organosiloxane copolymer that can be represented by a general formula selected from the group consisting of

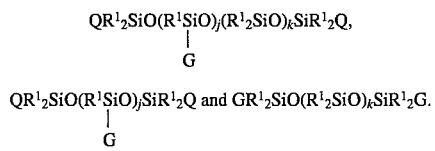

In these formulae each $R^1$ is individually selected from the group consisting of unsubstituted and substituted monovalent hydrocarbon radicals; G is a polyoxyalkylene group having an average structure selected from the group consisting of

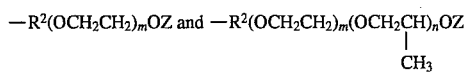

wherein $R^2$ represents a divalent hydrocarbon radical containing from 2 to 20 carbon atoms; Q is $R^1$ or G; Z is selected from the group consisting of hydrogen, alkyl radicals containing from 1 to 4 carbon atoms and acyl groups containing from 2 to 6 carbon atoms; and j, k, m and n are individually selected from positive integers.

In a preferred embodiment $R^1$ contains from 1 to 12 carbon atoms. In a more preferred embodiment, $R^1$ is individually selected from the group consisting of alkyl, cycloalkyl, aryl, benzyl and tolyl. $R^2$ preferably contains from 3 to about 6 atoms, the positive integers represented by j and k are preferably from 1 to 100, preferably from 1 to 10, inclusive; and the positive integers represented by m and n are preferably from 1 to 20.

The terminal atom or group of the oxyalkylene portion of the molecule is represented by Z, which can be a hydrogen atom, an alkyl radical containing from 1 to 6 carbon atoms or an acyl group containing from 2 to 6 carbon atoms.

The monovalent hydrocarbon radicals represented by $R^1$ that are bonded to the silicon atoms of ingredient E can contain from 1 to 12 or more carbon atoms. $R^1$ can be alkyl, including but not limited to methyl, ethyl, propyl, butyl and octyl; cycloalkyl, including by not limited to cyclopentyl and cyclohexyl; aryl, including phenyl and naphthyl; benzyl; and tolyl.

Preferably all of the hydrocarbon radicals represented by $R^1$ are alkyl radicals containing from 1 to 4 carbon atoms. Most preferably all of these hydrocarbon radicals are methyl, based on the availability of the copolymers and the compatibility of the copolymers with the diluents of the present compositions.

The factors determining the selection of the values for j, k, m and n are 1) the level of thixotropic properties to be imparted to the present compositions by the copolymer, 2) the ability of the copolymer to be solubilized by the particular diluent selected, and 3) the requirement that the copolymer be a liquid at the use temperature of the curable composition, which can be as low as 0° C.

The diluent in the present compositions is a liquid organosiloxane oligomer containing at least one phenyl-containing siloxane unit per molecule. The diluent will be discussed in detail in the following section of this specification.

To achieve the desired level of thixotropy, the thixotropic agent (ingredient E) should constitute from 0.01 to about 1 weight percent of the present compositions. The preferred concentration of the thixotropic agent is from about 0.05 to about 0.3 weight percent.

The present inventors have determined that the solubility of a given copolymer suitable for use as ingredient E in a diluent appears to be inversely proportional to 1) the molecular weight of the organosiloxane portion of the copolymer, which is, in turn, directly proportional to the sum of j and k, and 2) the number of oxyethylene and oxypropylene units in the copolymer, represented by m and n, respectively.

The ability of a given diluent to dissolve ingredient E together with the crosslinking agent and catalyst for the crosslinking reaction is directly proportional to the molar ratio of phenylalkylsiloxane units to other siloxane units in the molecules of diluent and inversely proportional to the molecular weight of the diluent.

It should be apparent from this discussion that solubility of ingredient E in the diluent is maximized by using the lowest molecular weight embodiment of ingredient E that will provide the desired level of thixotropy and by maximizing the phenyl content of the diluent and minimizing its molecular weight.

The data in the accompanying examples demonstrate that only low molecular weight copolymers (ingredient E) are soluble in the higher molecular weight diluents.

The Diluent (Ingredient F)

The purpose of the diluent is to solubilize the thixotropic agent, the crosslinking agent and the catalyst, thereby allowing a mixture of these ingredients to be uniformly dispersed in the curable polyorganosiloxane that constitutes the major reactive ingredient of the base portion of the present two-part compositions.

Ingredient F is an organosiloxane oligomer that is a liquid at the use temperature of the present compositions and contains at least one siloxane unit with at least one phenyl-containing hydrocarbon radical bonded to the silicon atom.

This phenyl-containing hydrocarbon radical can be phenyl or phenylalkyl wherein the alkyl portion contains from 1 to 4 carbon atoms. The siloxane unit(s) with the phenyl-containing hydrocarbon radical can contain a total of one, two or three hydrocarbon radicals.

Preferred embodiments of ingredient F include 1) cyclic and linear oligomers containing phenylalkylsiloxane or (phenylalkyl)alkylsiloxane units and combinations of at least one of these phenyl-containing siloxane units with at least one dialkylsiloxane unit; and 2) linear oligomers comprising at least one phenylsilsesquioxane unit and trialkylsiloxane units.

The phenyl-containing siloxane units present in ingredient F can be represented by the formula s $R^3_s Ph_t(C_p H_{2p}) SiO_{((4-s-t)/2)}$, wherein Ph represents phenyl, $R^3$ represents an alkyl radical containing from 1 to about 10 carbon atoms, s is 0, 1 or 2, t is 1 or 2, the sum of s and t does not exceed 3, and p is 0 or an integer from 1 to 4. $R^3$ preferably contains from 1 to 3 carbon atoms, and is most preferably methyl. The preferred t is 1.

Examples of suitable phenyl-containing siloxane units include but are not limited to methylphenylsiloxane units, methyl-beta-phenylethyl-siloxane units, methyl-2-methyl-2-phenylethylsiloxane units and phenylsilsesquioxane units.

When the phenyl-containing siloxane unit or units in ingredient F are arranged in a linear configuration, the two terminal triorganosiloxane units present in each molecule contain three monovalent hydrocarbon radicals bonded to the silicon atom. These hydrocarbon radicals can be all alkyl, such as methyl, or a combination of two alkyl and one phenyl radical.

The organosiloxane oligomers suitable for use as ingredient F can be used alone or in combination with other liquid oligomeric organosiloxanes that do not contain any phenyl-substituted hydrocarbon radicals.

Because the compatibility of the diluent with the thixotropic agent decreases with increasing molecular weight of the diluent, the diluent should contain no more than an average of about 30 repeating units, preferably no more than about 10 repeating units per molecule, at least 20 percent of which are phenylalkylsiloxane units.

As indicated in the preceding section of this specification, to ensure solubility of the higher molecular weight thixotropic agents that may be required or be the only ones available, the oligomer(s) used as ingredient F should have the lowest possible molecular weight and highest phenyl content commensurate with the cost and availability of this ingredient.

If cost and availability were not considerations, cyclic methylphenylsiloxanes would be the preferred diluents, particularly for higher molecular weight thixotropic agents, followed by trimethylsiloxy-terminated polymethylphenylsiloxanes and linear oligomers containing trimethylsiloxy and phenylsilsesquioxane units.

Conversely, if only higher molecular weight oligomers were available, this would limit the choice of thixotropic agents to those containing an average of fewer than about 10 organosiloxane units per molecule.

Optional Ingredients

In addition to ingredients referred to as A, B, C, D, E, and F, the present compositions can contain additional ingredients to modify the properties of the curable composition or cured materials prepared using this composition. These additional ingredients include but are not limited to liquid diluents in addition to the organosilicon oligomers referred to as ingredient F, stabilizers to inhibit degradation in the presence of heat and/or ultraviolet light, anti-oxidants, dyes, pigments and flame retardants.

Preparation and Curing of Curable Compositions

The curable compositions of this invention are prepared by blending the base portion of the composition, comprising ingredient A and ingredient B, with the curing agent portion containing ingredients C, D, E and F. Crosslinking or curing of the composition begins when ingredients A, C and D are combined with the water present in the composition, and requires from several minutes to several hours, depending upon the relative humidity in the environment, the temperature, and the type and concentration of crosslinking catalyst and working time extender.

Optional ingredients such as pigments and dyes can be packaged in one or more parts of the present compositions, so long as these are substantially free of water.

In an alternative embodiment, the thixotropic agent is packaged as a third component, separated from the portion containing the crosslinking agent and catalyst. This allows the user of the composition to vary the degree of thixotropy by varying the amount of thixotropic agent added to the curable composition without affecting the concentration of crosslinking agent and crosslinking catalyst, which would affect the physical properties of cured materials prepared using the present compositions.

The elastomers prepared using the present compositions are suitable for use in a variety of end use applications, including sealants, coating materials and as pottants or encapsulants for electrical and electronic devices. The compositions are particularly useful for preparing molds by applying the composition onto the surface of a master to be replicated. The thixotropic nature of the present compositions allows them to be non-flowing when applied to a vertical surface while exhibiting a viscosity in the presence of shearing forces that is sufficiently low to allow the compositions to be sprayed using conventional equipment.

Preferred compositions exhibit a viscosity of from 55,000 to about 80,000 centipoise (55 to 80 Pa.s) when measured at 25° C. using a Brookfield model RV viscometer equipped with a number 6 spindle rotating at a speed of 10 revolutions per minute. These compositions do not flow substantially prior to curing when applied as a 0.38 cm.-thick layer on a vertical surface.

EXAMPLES

The following examples describe compositions containing preferred combinations of thixotropic agents and organosiloxane oligomers as diluents for the thixotropic agents. The examples should not be interpreted as limiting the invention defined in the accompanying claims. Unless otherwise indicated all parts and percentages in the examples are by weight and viscosities are the values measured at 25° C.

EXAMPLE 1

This example demonstrates the increase in working time that can be achieved using a working time extender of the present invention.

The base portion of a curable organosiloxane composition was prepared by blending the following ingredients to homogeneity:

21 parts of a trimethylsiloxy-terminated polydimethylsiloxane exhibiting a viscosity of 0.35 Pa.s;

3 parts of hexamethyldisilazane;

21 parts of a precipitated silica exhibiting an average particle size of 4 microns;

1 part of water;

11 parts of zirconium silicate exhibiting an average particle size of 5 microns;

42 parts of a silanol-terminated polydimethylsiloxane exhibiting a viscosity of 10 Pa.s; and 0.8 part of an emulsion prepared by blending 35 parts of water, 60 parts of a liquid trimethylsiloxy-terminated polydimethylsiloxane exhibiting a viscosity of 0.35 Pa.s, and 4 parts of a non-ionic surfactant, 2,6,8-trimethyl-4-nonyloxypolyethyleneoxyethanol, and 1 part of sodium polyethylene oxide octylphenoxy sulfonate.

A thixotropic crosslinking agent/catalyst mixture was prepared by blending 7 parts of tetraethyl orthosilicate and 7 parts of phenyltrimethoxysilane as the crosslinking agents; 3 parts of dibutyltin dineodecanoate as the catalyst; as the thixotropic agent, 1.2 parts of an organosiloxane copolymer represented by the average formula

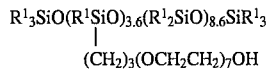

where $R^1$ represents methyl; and, as the diluent, 82 parts of an equilibrated mixture of cyclic organosiloxanes containing equimolar quantities of dimethylsiloxane and methylphenylsiloxane units.

Curable compositions were prepared by adding 1 part of the crosslinking agent/catalyst mixture to 10 parts of the base portion of the compositions. The resultant mixture was a curable composition of this invention containing 0.6 weight percent of the catalyst based on the weight of the composition. The viscosity of the freshly-prepared composition was 55 Pa.s, measured using a Brookfield viscometer equipped with a number 6 spindle rotating at a speed of 10 revolutions per minute.

A second curing agent portion composition of this invention was prepared by blending the following ingredients to homogeneity:

8 parts of ethyl polysilicate;

8 parts of n-propyl orthosilicate;

10 parts of dimethyltin dineodecanoate;

1 or 2 parts of a thixotropic agent with the formula

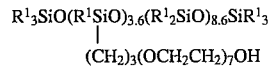

where $R^1$ represents a methyl radical; and a trimethylsiloxy-terminated phenylmethylsiloxane oligomer exhibiting a viscosity of about 20 centistokes ($2 \times 10^{-5}$ m$^2$/second) in an amount of 73 parts using 1 part of thixotropic agent and 72 parts using 2 parts of thixotropic agent.

This curing agent portion was blended with the base portion described in the first part of this example using a "GRACO" Minimate spray system equipped with an in-line static mixers and a type 2004-000 spray gun. "GRACO" is a registered trademark of Graco, Inc. of Golden Valley, Minn. The feed rates were adjusted to supply ten parts by volume of base for each part of curing agent portion.

Air under a pressure of from 30 to 60 psig (310 to 518 kPa) was admitted into the nozzle portion of the spray gun to obtain air-assisted spraying. The substrate to be coated was a sheet of wood measuring 48 by 48 inches (122 cm. by 122 cm.) located 2 feet (61 cm.) from the tip of the spray gun.

The maximum coating thickness that could be applied without slumping of the coating was 0.060 inches (0.15 cm.) using the composition containing 1 part of the thixotropic agent. Using the composition containing 2 parts of the thixotropic agent, the maximum coating thickness that could be applied without slumping was 0.2 inches (0.5 cm.).

The rate of slump exhibited by compositions containing 1, 1.5 and 2 weight percent of the thixotropic agent was determined using a slump tester in the form of a rectangular sheet of aluminum containing a circular cavity adjacent to one of the shorter sides of the rectangle. The cavity was 1 inch (2.5 cm.) in diameter and 0.15 inches (0.38 cm.) deep and was filled to the level of the remainder of the sheet with the composition to be evaluated.

With the longer sides of the sheet maintained in a vertical position the composition to be evaluated was forced out of the cavity and allowed to flow down the surface of the sheet. The amount of time required for the composition to travel a specified distance down the face of the sheet at a temperature of 16° C. was determined and the results are recorded in Table 1.

TABLE 1

| Wt. % Thixotropic Agent | Slump (cm.) | Time (min.) |
|---|---|---|
| 1 | 10 | 6 |
| 1 | 10 | 3 |
| 1.5 | 7.5 | 6 |
| 1.5 | 9.5 | 11 |
| 2 | 7.4 | 11 |
| 2 | 3.1 | 11 |

For comparative purposes a curable composition containing the same ingredients but omitting the thixotropic agent and substituting an equal weight of liquid polydimethylsiloxane for the polyphenylmethylsiloxane used as the diluent flowed off the aluminum sheet in about 15 seconds.

EXAMPLE 2

This example demonstrates the effect of the molecular weight of the thixotropic agent and the molecular weight and phenyl content of the organosiloxane oligomer used as the diluent on the ability of a diluent to act as a solvent for a number of thixotropic agents. The five thixotropic agents evaluated are identified as D1 to D5, and had the following average formulae, wherein $R^1$ is methyl

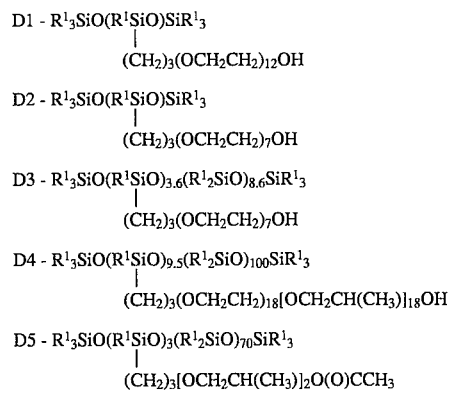

The following organosiloxane were evaluated as diluents.

E1—A mixture of cyclic diorganosiloxane oligomers consisting essentially of a 1:1 mole ratio mixture of dimethylsiloxane and phenylmethylsiloxane units.

E2—A trimethylsiloxy-terminated methylphenylsiloxane oligomer exhibiting a viscosity of 500 centistokes ($5 \times 10^{-4}$ m$^2$/sec.).

E3—A trimethylsiloxy-terminated dimethylsiloxane/phenylmethylsiloxane copolymer wherein the molar ratio of dimethylsiloxane to phenylmethylsiloxane units was 1:2 and the viscosity was 125 centistokes (1.25×10$^{-4}$ m$^2$/sec.).

E4—A mixture consisting essentially of 18 weight percent of (Me$_3$SiO)$_3$SiPh; 48 weight percent of [(Me$_3$SiO)$_2$PhSi]$_2$O and 34 weight percent of [(Me$_2$SiO)$_2$PhSiO]$_2$PhSi[OSiPh(OSiMe$_2$)]$_2$Me, where Me represents a methyl radical and Ph represents a phenyl radical.

E5—(Comparative Example) A trimethylsiloxy-terminated dimethylsiloxane/methylphenylsiloxane copolymer wherein the molar ratio of dimethylsiloxane to phenylmethylsiloxane units was 9:1 and the viscosity was 30,000 centistokes (3×10$^{-2}$ m$^2$/sec.).

Mixtures containing 30 weight percent of one of the foregoing organosiloxane copolymers and 70 weight percent of one of the aforementioned oligomers were prepared and evaluated for solubility of the copolymer in the oligomer. The results of this evaluation are summarized in Table 2.

TABLE 2

| Surfactant | | Solubility In Organosiloxane Oligomer | | | | |
|---|---|---|---|---|---|---|
| Type | Viscosity* | E1 | E2 | E3 | E4 | E5** |
| D1 | 70 | NE | S | NE | NE | I |
| D2 | 40 | S | S | S | NE | I |
| D3 | 250 | S | C/I | I | S | NE |
| D4 | 1700 | S | S | C/I | NE | NE |
| D5 | 170 | I | I | NE | NE | C |

S = Soluble;
I = Insoluble;
C/I = Initially cloudy, precipitate forms upon standing;
NE = Not Evaluated.
* = m$^2$/second × 10$^6$
** = evaluated for comparative purposes, above the molecular weight limit for present invention.

The data in Table 2 indicates that only the lower molecular weight oligomers dissolve the higher molecular weight thixotropic agents. The ability of thixotropic agent D4 to dissolve to a slightly greater extent than D5 appears due to the higher concentration of oxyalkylene units in D4, which appears to offset the higher molecular weight of the organosiloxane portion of the copolymer.

That which is claimed is:

1. A moisture curable organosiloxane composition comprising

I. A base portion comprising
   A. a curable liquid polydiorganosiloxane containing at least two silanol or hydrolyzable groups per molecule;
   B. a particulate filler containing hydroxyl groups on the surface of the particles; and II. a curing agent portion comprising
   C. an amount of a crosslinking agent sufficient to crosslink said composition in the presence of moisture of an organosilicon compound containing at least three silicon-bonded hydrolyzable groups per molecule;
   D. an amount of a catalyst sufficient to promote crosslinking of said composition;
   E. an amount sufficient to impart thixotropy to said composition of a liquid organosiloxane copolymer of a general formula selected from the group consisting of

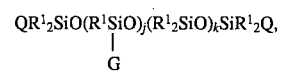

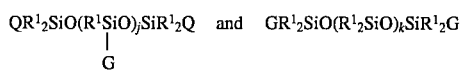

wherein each R$^1$ is individually selected from the group consisting of unsubstituted and substituted monovalent hydrocarbon radicals; G is a polyoxyalkylene group having an average structure selected from the group consisting of

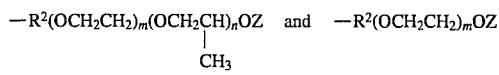

wherein R$^2$ represents a divalent hydrocarbon radical containing from 2 to 20 carbon atoms; Q is R$^1$ or G; Z is selected from the group consisting of hydrogen, alkyl radicals containing from 1 to 4 carbon atoms and acyl groups containing from 2 to 6 carbon atoms; j and k are individually selected from positive integers; and m and n are individually selected from positive integers; and F. a liquid organosiloxane oligomer selected from the group consisting of cyclic organosiloxane oligomers and triorganosiloxy-terminated linear organosiloxane oligomers wherein at least one siloxane unit contains at least one phenyl or phenylalkyl radical bonded to the silicon atom of said unit, and the molecular weight of said oligomer and the concentration of phenyl and phenylalkyl radicals in said oligomer are sufficient to solubilize said organosilicon compound, catalyst and organosiloxane copolymer in said oligomer.

2. A composition according to claim 1 wherein R$^1$ represents an alkyl radical containing from 1 to 4 carbon atoms; R$^2$ represents an alkylene radical containing from 3 to 6 carbon atoms; the positive integers represented by j and k are from 1 to 100, inclusive; the positive integers represented by m and n are from 1 to 20, inclusive; Q is R$^1$; Z is a hydrogen atom or —(O)CCH$_3$; said copolymer constitutes from 0.01 to 1 weight percent of said composition, said oligomer contains no more than 30 siloxane units per molecule and comprises units of the formula R$^3{}_s$[Ph(C$_p$H$_{2p}$)]$_t$SiO$_{((4-s-t)/2)}$, wherein Ph represents phenyl, R$^3$ represents an alkyl radical containing from 1 to about 10 carbon atoms, s is 0, 1 or 2, the sum of s and t does not exceed 3, and p is 0 or an integer from 1 to 4.

3. A composition according to claim 2 wherein R$^1$ is methyl, R$^2$ is propylene, the positive integers represented by j and k are from 1 to 10, inclusive; s 0, 1 or 2, t is 1, p is 0 or 3, said organosiloxane copolymer constitutes from 0.05 to 0.3 weight percent of said composition, said oligomer contains an average of not more than ten siloxane units per molecule and is selected from the group consisting of cyclic and linear phenylalkylsiloxanes, cyclic and linear diorganosiloxanes containing phenylalkylsiloxane and dialkylsiloxane units and linear oligomers containing phenylsilsesquioxane and trialkylsiloxane units.

4. A composition according to claim 3 wherein said phenylalkylsiloxane units are phenylmethylsiloxane units, said dialkylsiloxane units are dimethylsiloxane units; $R^3$ is methyl; and said oligomer is a cyclic or linear phenylalkylsiloxane.

5. A composition according to claim 1 wherein the repeating units of said curable polyorganosiloxane are represented by the formula $R^4{}_b SiO_{(4-b)/2}$ wherein each $R^4$ is individually selected from the group consisting of monovalent unsubstituted and substituted hydrocarbon radicals and b is 1 or 2; the number average molecular weight of said polyorganosiloxane is from 25,000 to 75,000; said curing agent is a silane containing at least three hydrolyzable groups per molecule selected from the group consisting of alkoxy containing from 1 to 4 carbon atoms, carboxy containing from 2 to 4 carbon atoms and ketoximo; and said catalyst is selected from the group consisting of compounds of titanium, aluminum, zirconium and tin.

6. A composition according to claim 5 wherein $R^4$ is selected from the group consisting of methyl, ethyl, phenyl and 3,3,3-trifluoropropyl; b is 2; said hydrolyzable group is alkoxy; said organosilicon compound constitutes from 0.5 to 6 weight percent of said composition; and said catalyst is a tin compound.

* * * * *